US012592488B1

(12) United States Patent
Wang et al.

(10) Patent No.: US 12,592,488 B1
(45) Date of Patent: Mar. 31, 2026

(54) ANTENNA ARRAY PANEL FOR USE IN MOBILE DEVICES

(71) Applicant: Micro Mobio Corporation, Palo Alto, CA (US)

(72) Inventors: Guan-Wu Wang, Palo Alto, CA (US); Terng-Jie Lin, Hsinchu-City (TW); Yi-Hung Chen, Hsinchu City (TW); Wen-Chung Liu, Hsinchu-City (TW); Weiping Wang, Palo Alto, CA (US); Zlatko Aurelio Filipovic, San Jose, CA (US)

(73) Assignee: Micro Mobio Corporation, Palo Alto, CA (US)

( * ) Notice: Subject to any disclaimer, the term of this patent is extended or adjusted under 35 U.S.C. 154(b) by 0 days.

(21) Appl. No.: 18/732,373

(22) Filed: Jun. 3, 2024

Related U.S. Application Data

(63) Continuation-in-part of application No. 18/513,626, filed on Nov. 19, 2023, now Pat. No. 12,003,044, which is a continuation of application No. 17/870,639, filed on Jul. 21, 2022, now Pat. No. 11,824,281, which is a continuation of application No. 17/187,853, filed on Feb. 28, 2021, now Pat. No. 11,404,788.

(60) Provisional application No. 62/983,446, filed on Feb. 28, 2020.

(51) Int. Cl.
*H01Q 9/00* (2006.01)
*H01Q 1/48* (2006.01)
*H01Q 5/10* (2015.01)
*H01Q 5/335* (2015.01)
*H01Q 9/04* (2006.01)

(52) U.S. Cl.
CPC ............. *H01Q 9/0414* (2013.01); *H01Q 1/48* (2013.01); *H01Q 5/10* (2015.01); *H01Q 5/335* (2015.01); *H01Q 9/045* (2013.01)

(58) Field of Classification Search
CPC .......... H01Q 9/0414; H01Q 1/48; H01Q 5/10; H01Q 5/335; H01Q 9/045
See application file for complete search history.

(56) References Cited

U.S. PATENT DOCUMENTS

| | | | | |
|---|---|---|---|---|
| 11,404,788 | B1 | 8/2022 | Wang | |
| 11,824,281 | B1 | 11/2023 | Wang | |
| 2015/0194736 | A1 | 7/2015 | Diukman | |
| 2016/0178730 | A1* | 6/2016 | Trotta | G01S 13/931 342/175 |
| 2017/0117620 | A1* | 4/2017 | Lapushin | H01Q 9/0421 |
| 2018/0062272 | A1* | 3/2018 | Haziza | H01Q 21/0087 |
| 2018/0159213 | A1* | 6/2018 | Haziza | H01Q 1/38 |
| 2019/0109387 | A1* | 4/2019 | Samadi Taheri | H01Q 9/42 |
| 2019/0229398 | A1* | 7/2019 | Ryoo | H01Q 1/243 |
| 2020/0014113 | A1* | 1/2020 | Asaka | H01Q 9/0414 |

(Continued)

*Primary Examiner* — Ping Y Hsieh
(74) *Attorney, Agent, or Firm* — ROARK IP

(57) ABSTRACT

A mobile device having array antenna can be used to communicate with Earth orbiting satellites and base stations on the ground. The display screen of the mobile device has an array antenna capable of transmitting and receiving radio frequency (RF) signals in the range of 0.6 GigaHertz (GHz) to 100 GHz. The configuration of the array antenna, including the number of arrays and the dimension of the arrays, is software programmable by activating and deactivating antenna elements for multiple beams and their beam characteristics.

20 Claims, 11 Drawing Sheets

(56) References Cited

U.S. PATENT DOCUMENTS

| | | | | |
|---|---|---|---|---|
| 2020/0083591 | A1* | 3/2020 | Hsieh | H01Q 21/30 |
| 2021/0005977 | A1* | 1/2021 | Franson | H01Q 1/48 |
| 2021/0098882 | A1* | 4/2021 | Paulotto | H01Q 1/243 |
| 2021/0210855 | A1* | 7/2021 | Yue | H01Q 13/02 |
| 2022/0006192 | A1* | 1/2022 | Zhao | H01Q 1/242 |

* cited by examiner

ANTENNA ARRAY PANEL FOR USE IN MOBILE DEVICES

PRIORITY CLAIM

This patent application claims priority to U.S. patent application Ser. No. 18/513,626, filed on Nov. 19, 2023; which is a Continuation-In-Part of U.S. patent application Ser. No. 17/870,639, filed on Jul. 21, 2022; which is a Continuation of Ser. No. 17/187,853, filed on Feb. 28, 2021; which is a non-provisional of U.S. Provisional Patent Application No. 62/983,446 filed on Feb. 28, 2020. The aforementioned applications are incorporated herein by reference in their entireties.

TECHNICAL FIELD

This application relates to a miniature antenna for use in microwave and millimeter-wave (mmWave) frequency ranges, in particular, an antenna element that can be attached to a circuit board with surface mount technology or integrated with RF circuits and fabricated on a semiconductor substrate or a printed circuit board (PCB).

BACKGROUND

The use of wireless communication systems has increased due to both an increase in the types of devices user equipment network resources as well as the amount of data and bandwidth being used by various applications, such as video streaming, operating on these UEs. For example, the growth of network use by Internet of Things (IoT) devices have severely strained network resources and increased communication complexity. There is a need for antenna equipment with enhanced user mobility.

SUMMARY

Aspects of the disclosure include an antenna element capable of transmitting and receiving radio frequency (RF) signals comprising: an isolated director capable of directing wireless radio frequency (RF) signals for a resonator; the resonator formed in a substantially looped configuration with a feed line and a terminal end and which is capable of transmitting and receiving RF signals; a three dimensional ground assembly comprising a plurality of metallized half cylindrical hole channels on a back side and a plurality of lines connecting a top and bottom metal ground plate allowing the ground assembly to be accessible from the top side, bottom side and back side of the antenna and the lines; and a dielectric material located between the director, the resonator, the top metal ground plate, and the bottom metal ground plate. between the director, the resonator, the top plate, and the bottom plate. The integration of antenna with radio frequency (RF) circuits can reduce the cost of fabrication and reduce the size of mobile devices such as smartphones for communication with base stations on the earth ground and satellites in earth orbits. A software programmable antenna array geometric configuration provides adaptive antenna performance parameters.

BRIEF DESCRIPTION OF THE DRAWINGS

The accompanying drawings, which are incorporated in and form a part of this specification, illustrate embodiments of the invention and, together with the description, serve to explain the principles of the disclosure.

DETAILED DESCRIPTION

Figure 1A:
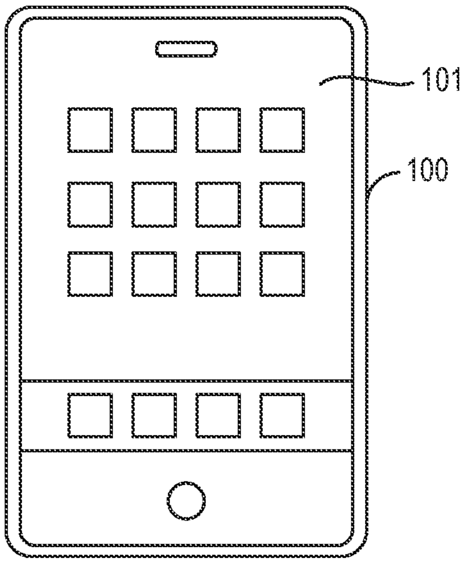
FIGS. 1A-1D show a mobile device 100 such as a smartphone, wireless tablet, or computer incorporating a printed circuit board 101 and transceiver circuitry 108 with antenna elements 200 as disclosed herein.

The upcoming fifth generation technology standard for broadband communication networks (i.e., 5G) communication networks promise higher data rate, greater capacity, less latency and better quality of service than fourth generation long term evolution (4G LTE) networks. The 5G communication standards specify two frequency ranges including the microwave frequency which operates in the approximately 3 to approximately 30 GigaHertz (GHz) range and the millimeter wave (mmWave) frequency which operates in the approximately 24 GHz to approximately 300 GHz. Since higher frequency offers much wider bandwidth and therefore higher data rates than lower frequencies, it is beneficial to improve communication components such as antennas for 3 GHz and higher frequencies such as microwave and mmWave applications.

Figure 1B:
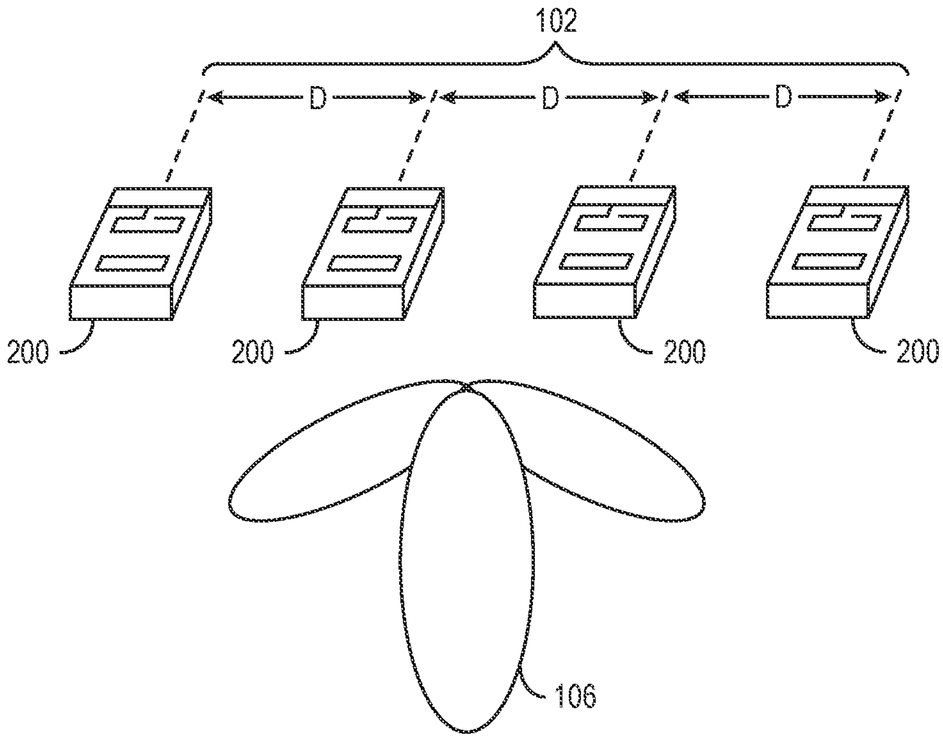
Figure 1C:
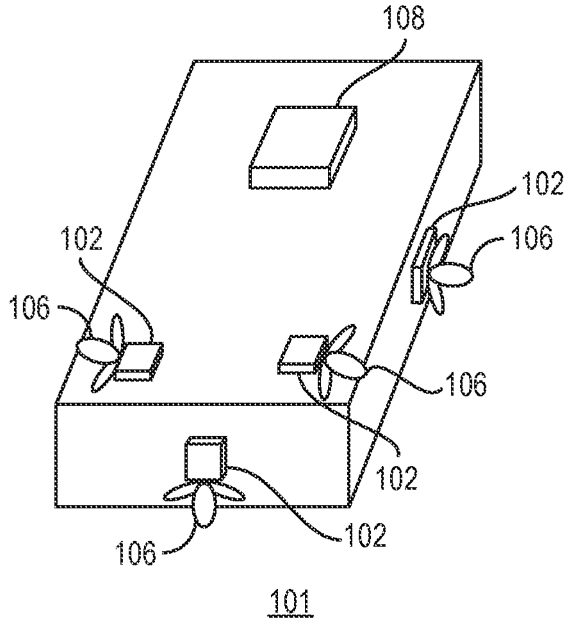
Figure 1D:
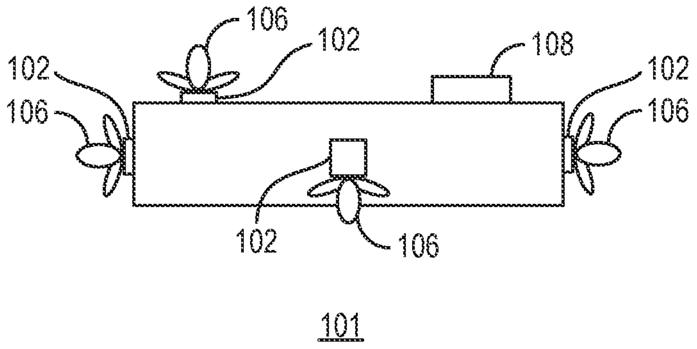

FIGS. 1A-1D show a mobile device 100 such as a smartphone wireless tablet or computing incorporating a printed circuit board 101 with an antenna array 102 as disclosed herein. FIG. 1B shows details of an antenna array 102 made up of one or more antenna elements 200. The back side 202 or bottom side 203 of the antenna element 200 is capable of being soldered to the printed circuit board (PCB) 101. A plurality of arrays 102 each having antenna elements 200 are shown mounted to the printed circuit board 101 in various positions and orientations as shown in FIGS. 1C and 1D. If the back side of the antenna element 200 is soldered to the surface of the printed circuit board 101, then the emitted and/or received radio frequency wave will be perpendicular to the surface of the PCB 101. If the bottom side of the antenna element 200 is soldered to the surface of the printed circuit board 101, then the emitted and/or received radio frequency wave will be parallel to the surface of the PCB 101. By mounting the antenna element arrays 102 in different orientations and on different sides of the PCB 101 as shown in FIGS. 1C and 1D this allows for high gain directional antennas. For example, a typical device 100 may have multiple antenna arrays 102 (e.g., five or more) mounted on the PCB 101 to provide for optimal coverage.

The antenna elements 200 are separated by a distance "D" in each array 102 and are capable of forming a signal beam 106 controlled by transceiver circuitry 108 (having power amplifiers, low noise amplifiers, phase shifters and the like) mounted on the PCB as shown in FIGS. 1C and 1D. The spacing D of the antenna elements 200 in an array allows for optimization of frequency and beam 106 shapes.

Antenna array 102 can be made up of the antenna elements (or antenna chips) 200 in an n by n array (e.g., 2×2, 4×4, 8×8, or the like) or an m by n array (e.g., 1×4, 1×8, 2×4, 2×6, 2×8, or the like). The arrays 102 could be mounted individually or as a group on the PCB 101. The antenna array 102 can be used to increase the gain of the signal 106, for beam forming and beam steering, for phase shifting, and/or for gesture tracking. The antenna arrays 102 mounted on the PCBs 101 are coupled to and controlled by the transceiver circuitry 108 of the device 100.

Beam 106 may be transmitted and received with the antenna elements 200 in a microwave range of 3 to 30 GigaHertz (GHz) and/or a millimeter wave (mmWave) range of approximately 30 Gigahertz (GHz) to approximately 300 GHz. Typically, beam 102 can operate in a range of up to plus or minus (+/−) 15% of microwave and millimeter wave signals for frequency such as approximately 24 GHz, 28 GHZ, 39 GHz, 60 GHz, and/or 77 GHz.

Figure 2A:
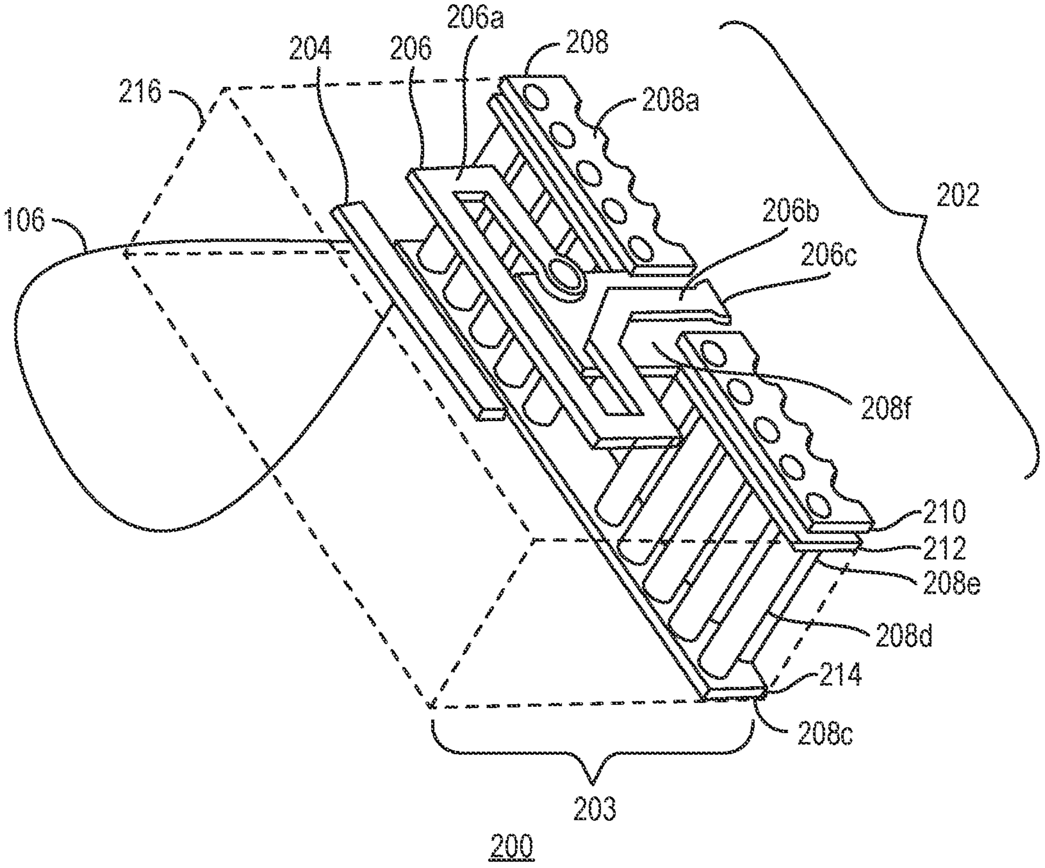
FIGS. 2A-2E illustrate detailed views of a first embodiment of an antenna element 200 of an array 102.
Figure 2B:
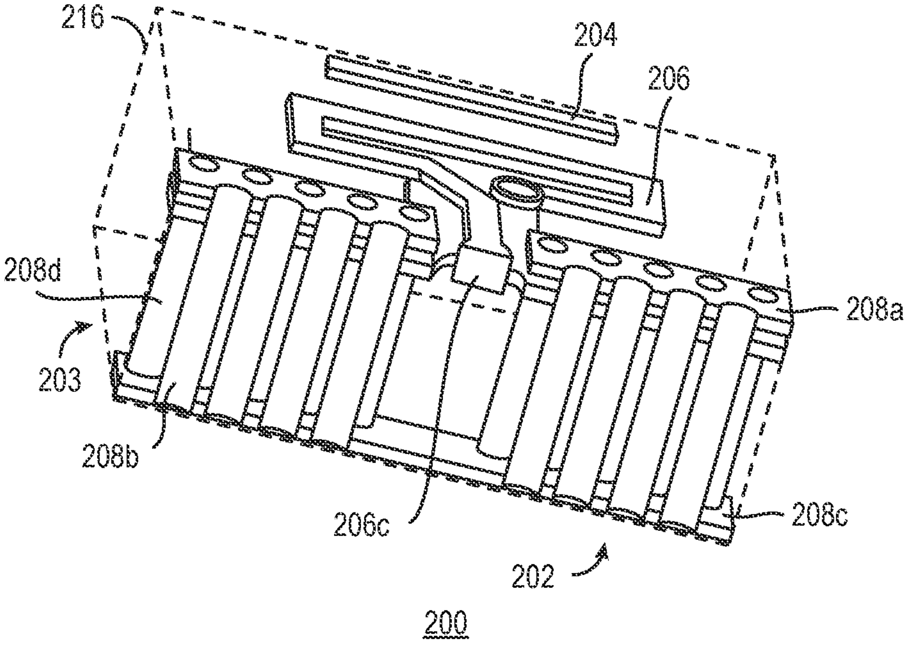
Figure 2C:
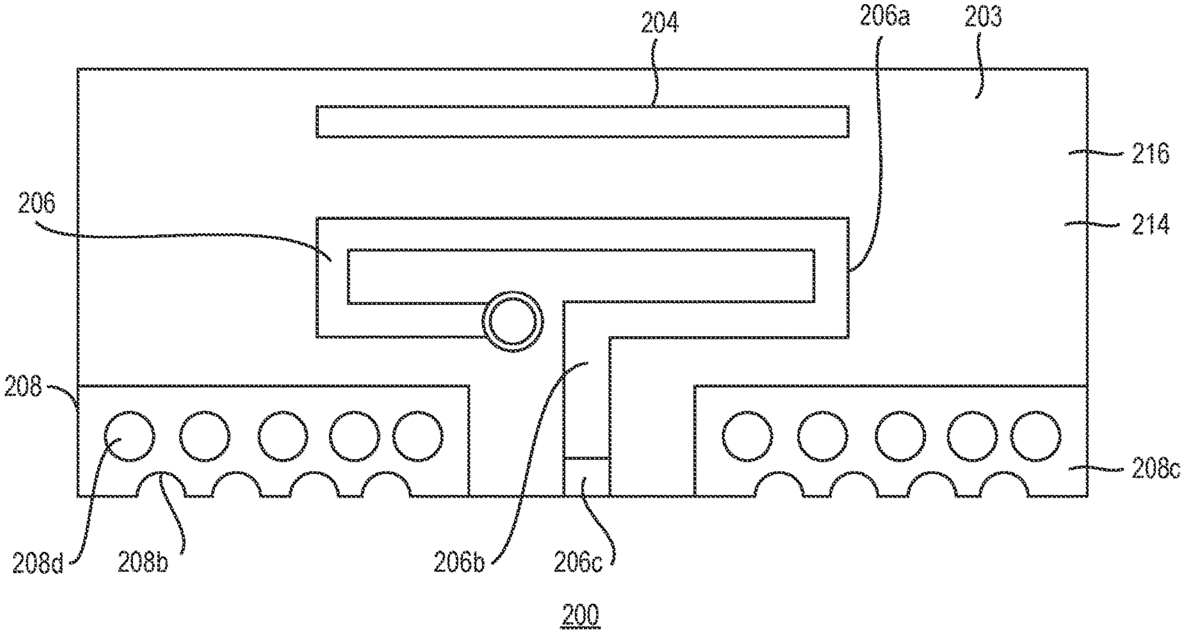
Figure 2D:
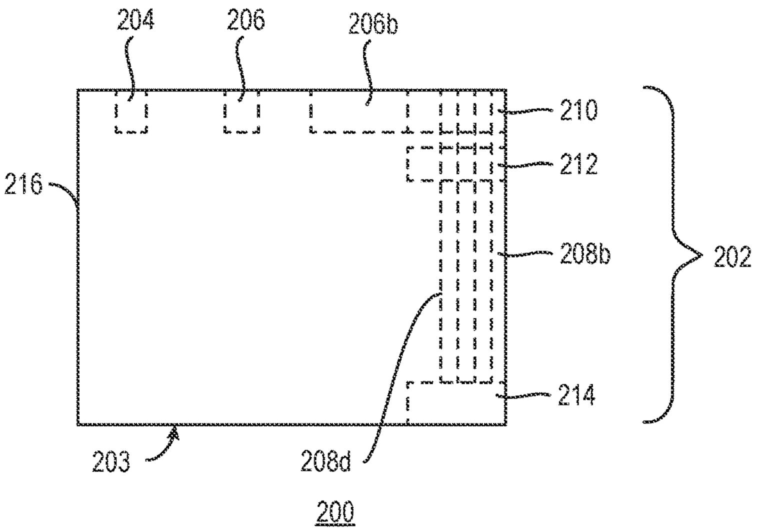

FIGS. 2A-2E illustrate detailed views of a first embodiment of an antenna element 200 of an array 102. FIG. 2A is a top side perspective view, FIG. 2B is a perspective view from the back side 202 of the antenna element, FIG. 2C is a view from the bottom side 203, and FIG. 2D is a side elevational view. This antenna element 200 comprises one or more directors 204, a resonator 206 and a three dimensional ground assembly 208. The parts 204, 206, and 208 of the antenna elements 200 are arranged on three metal layers (top layer 210, middle layer 212, and bottom layer 214). A top (or first) layer 210 includes an unconnected metal bar (or rod) which forms the beam director 204, a resonator 206 and a top part (or plate) portion 208*a* of the ground assembly 208. In the antenna element 200, the director (or passive radiator or parasitic element) is a conductive element (e.g., a metal rod) which is not electrically connected to anything else. It is located substantially parallel to the resonator 206 and substantially perpendicular to the line of direction of the emitted signals 106. The director 204 modifies the radiation pattern of the radio waves 106 emitted by the resonator 206 by re-radiating them and directing them in a beam 106 in one direction to increase the antenna element's 200 gain. The radio waves 106 from the different antenna elements 200 arranged in the array 102 interfere with other radio waves to strengthen the antenna array's 102 radiation in the desired direction and to cancel out the waves 106 in the undesired directions.

Figure 2E:
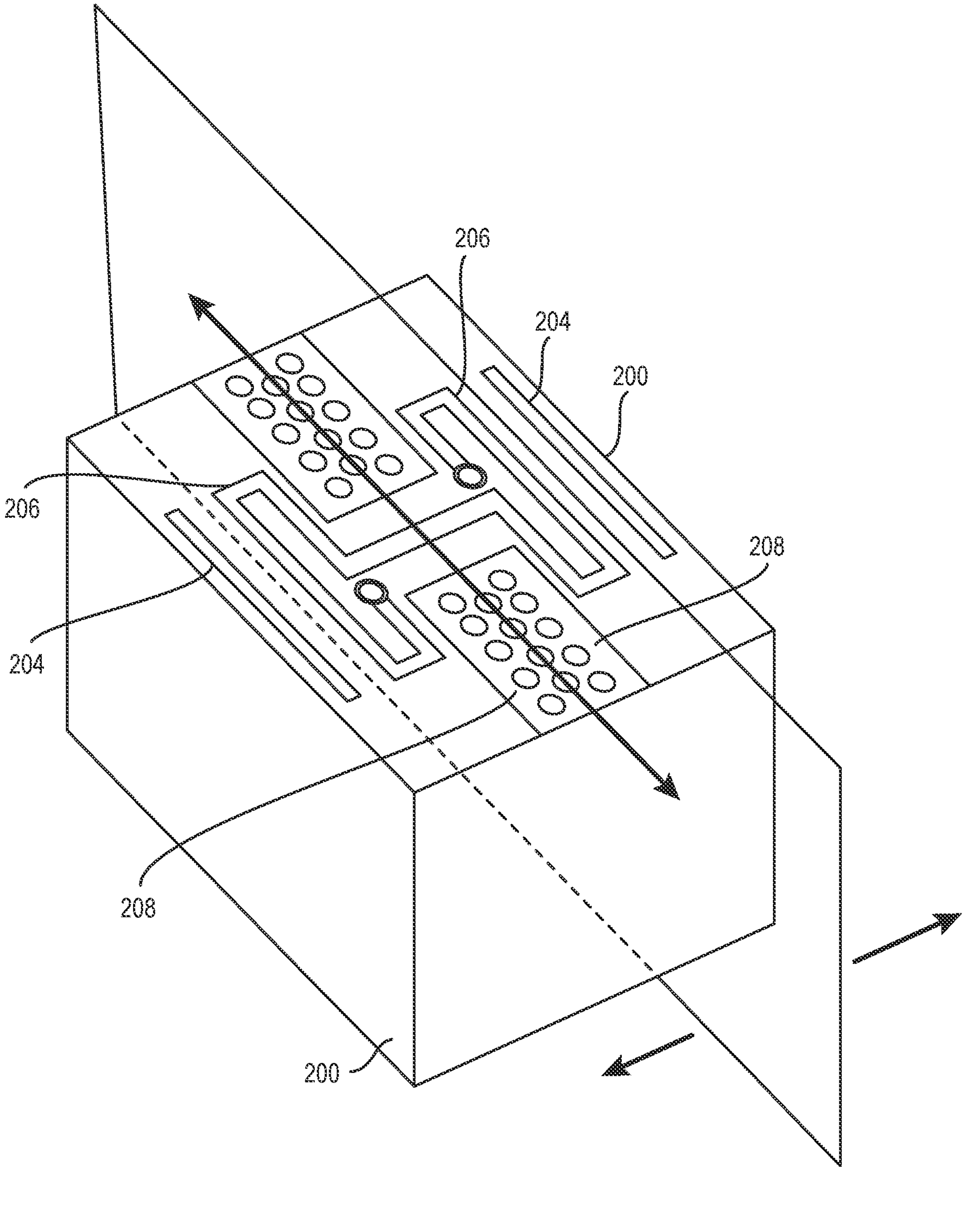

As shown in FIGS. 2A-2C, the resonator 206 is a driven element formed as an integral piece substantially in the form of a loop 206*a* connected to a feed line 206*b* and a feed line terminal ending 206*c*. High frequency transmitting signals (e.g., microwave, mmWave signals) are supplied to the terminal 206*c* from a power amplifier of the transceiver 108. In addition, high frequency signals are received at the director 204 and resonator 206 from the air and sent to circuitry on the PCB 101 from the feed line terminal ending 206*c*. The feed line terminal ending 206*c* provides impedance matching from the external transceiver circuit 108 to the resonator 206. The three dimensional ground assembly 208 includes a top layer ground plate 208*a* connected to a plurality of metallized half cylindrical hole channels (or metallized via holes) 208*b* which connect to a ground bottom plate 208*c* of the ground assembly 208 in the bottom layer 214. To interconnect grounding circuits on layers 210, 212 and 214, oftentimes one row of connections is sufficient for one antenna. But in this disclosure, three rows for two symmetric antenna elements 200 back to back are used. During manufacturing as shown in FIG. 2E, there is a splice through the middle row along line X-X resulting in two half cylindrical hole channels 208*b* (i.e., grooves) created on the backside 202 appropriate for soldering the backside for a surface mount to PCB 101. Therefore, the metalized half cylindrical hole channels 208*b* serve two purposes: enhancing interconnect of the grounds and as well as terminals for soldering to the PCB 101. The top layer ground plate 208*a* is also connected to ground bottom plate 208*c* by a plurality of metal lines 208*d* running substantially parallel to the half cylindrical hole channels 208*b*. The metal lines 208*d* can be either filled in to form solid metal poles or hollow (i.e., metal plating around a surface). Middle layer 212 has a middle ground plate 208*e* also connected to the half cylindrical hole channels 208*b* and the metal lines 208*d*. A ground metal segment 208*f* is integrally formed with and protrudes from the middle ground plate 208*e* of the ground assembly 208. This ground metal segment 208*f* is connected to the end of the resonator loop 206*b* and may interact with the resonator loop 206*b* to resonate. In an alternative embodiment, the ground metal segment 208*f* may not be physically connected by metal to the end of the resonator loop 206*b* but may perform a resonating function for a high frequency alternating electric field between the ground metal segment 208*f* and the resonator loop 206*b*. The top layer ground plate 208*a* in the first layer 210 is electrically connected to the middle ground plate 208*e* and ground metal segment 208*f* in the second layer 212 by metal lines 208*d* and half cylindrical hole channels 208*b*. As discussed above, the ground bottom plate 208*c* of the third layer 214 is connected to middle layer 212 with the cylindrical holes 208*d* and half cylindrical hole channels 208*b* which electrically connects the ground circuits of three layers (210, 212, and 214) to become a three dimensional ground assembly 208 which enhances the radiation and hence the gain of the antenna elements 200 of the array 102. When the ground assembly 208 is soldered to the PCB 101, the terminal 206*c* of the feed line 206*b* and the ground on the back side 202 are mated to the RF port and ground on the PCB 101, respectively. The feed line 206*b* can be connected by another metal to the bottom side RF terminal if the bottom side, rather than the back side, of the antenna element 200 is to be soldered to the PCB 101 as will be discussed in detail in connection with the second embodiment of FIG. 3.

The spaces between the metal layers (210, 212 and 214) are filled and surrounded with a dielectric material 216 whose dielectric constant (or permittivity) will determine the electrical characteristics and feature size of the parts of the antenna element 200 in this structure. The filling of dielectric material 216 can be produced with laminating methods. The RF characteristics of antenna element 200 may be determined by the thickness of the dielectric materials 216 between the first metal layer 210, second metal layer 212 and the third metal layer 214 (i.e., ground bottom plate 208*c*) and the dimensions of the resonator loop 206*a* and the feed line 206*b*. The thickness of the dielectric materials 216 between the second metal layer 212 and third metal layer 214 needs to be large enough to maintain a suitable aspect ratio so that the antenna element structure as a unit can stand on the back side 202 to be used as a surface mount device. The dielectrics 214 in the structure can be glass epoxy resin like FR-4, weaved Teflon sheet, low-temperature co-fired ceramics (LTCC) or semiconductor materials such as silicon (Si), gallium arsenide (GaAs), gallium nitride (GaN) or other compound semiconductors.

The antenna element 200 may be in a miniature form suitable for surface mount technology (SMT). The antenna element 200 may include terminals such as 206*c*, 208*a*,

208*b*, 208*c*, and 208*e* which can be soldered for external electrical connection by SMT to PCB 101.

FIG. 2C shows a bottom view on the bottom side 203 of the antenna element 200. In this first embodiment configuration, the antenna element 200 may be attached to the PCB 101 on the back side 202. If the back side 202 is soldered to the PCB 101, then terminal 206*c* is connected to 206*b* by a conductive metal such that the RF signal can be fed from the PCB 101 to resonator loop 206*a*. FIG. 2D is a side elevational view of the antenna element 200.

As discussed above, FIG. 2E shows a perspective view of a manufacturing step in the manufacturing of the antenna elements 200. Two antenna elements 200 are cut and separated along line X-X to form half cylindrical hole channels 208*b*.

Figure 3A:
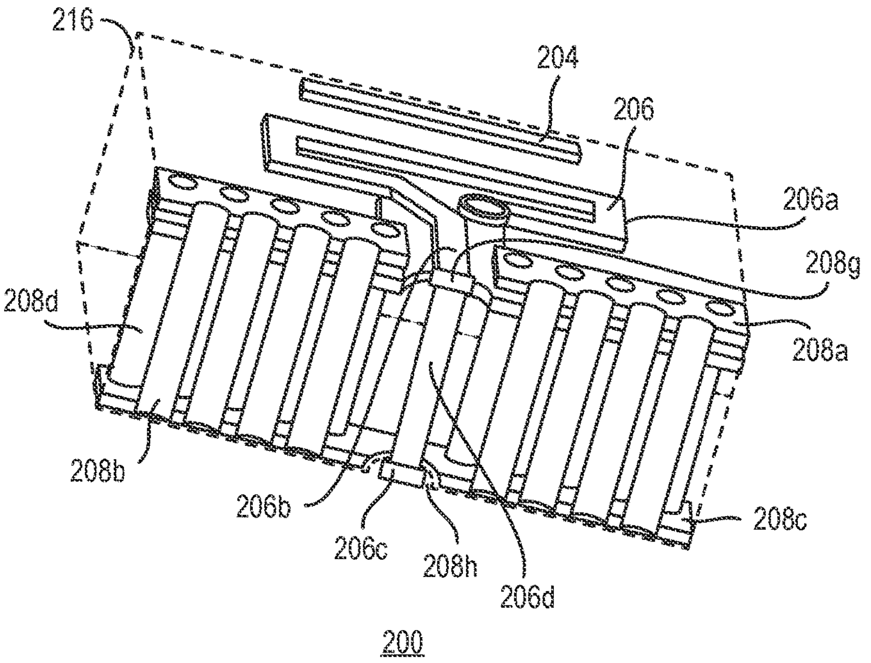
FIGS. 3A-3B show a second embodiment of the antenna element 200.
Figure 3B:
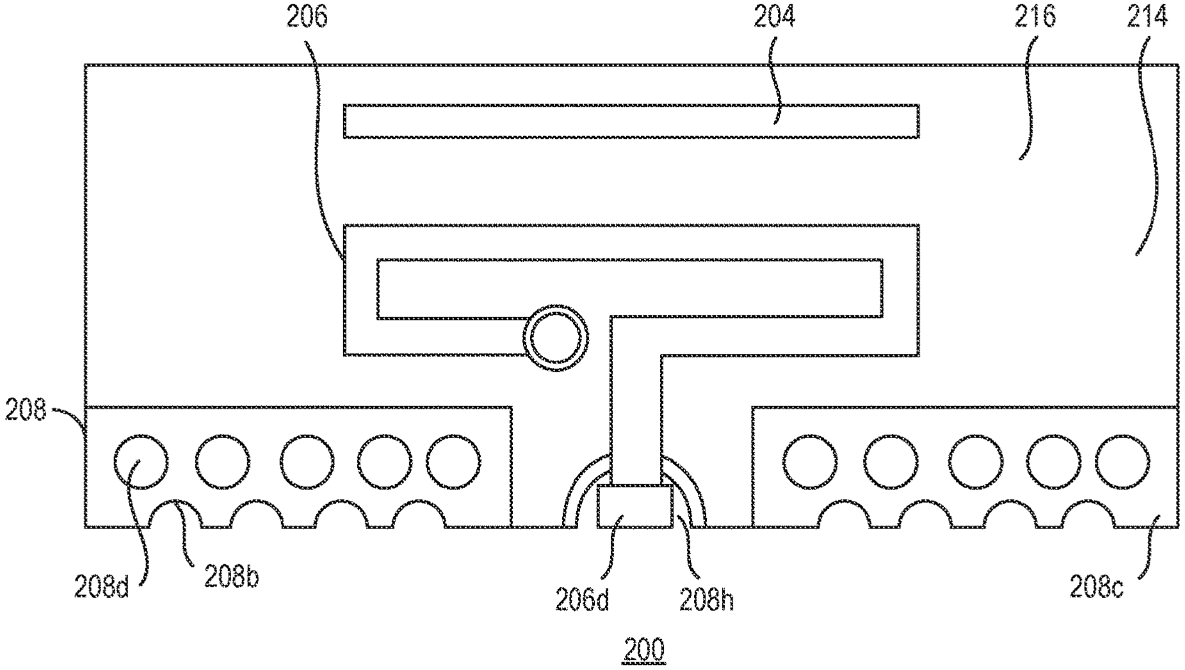

FIGS. 3A and 3B show a perspective view and a bottom view of a second embodiment of the antenna element 200 with a different configuration. In this embodiment, an integrated feed line extender 206*d* is connected to the feed line 206*b* so that the feed line terminal 206*c* is on the same level of the antenna element 200 as the bottom plate 208*c*. The feed line extender 206*d* is electrically isolated from the ground assembly 208 by spacing formed by a half circle hole 208*g* in the middle plate 208*e* and a half circle hole 208*h* in the bottom plate 208*c*. When soldering the antenna element 200 to the PCB 101, either the entire bottom side of the antenna element 200 may be on the PCB or, alternatively, only the metal parts of the bottom side 203 of the antenna element 200 will be soldered and the remaining portion of the bottom side 203 of the antenna element 200 will overhang from the edge of the PCB 101. In both the first and second embodiments of the antenna element 200, the top side of the antenna element is configured to be soldered on to the PCB 101 in a similar overhanging manner so that the director 204 and resonator 204 of the antenna element 200 is not in contact with the PCB 101 surface. In such a manner, the dielectric of the PCB 101 will not interfere with the director 204 and resonator 206 as they overhang in the air.

Figure 4:
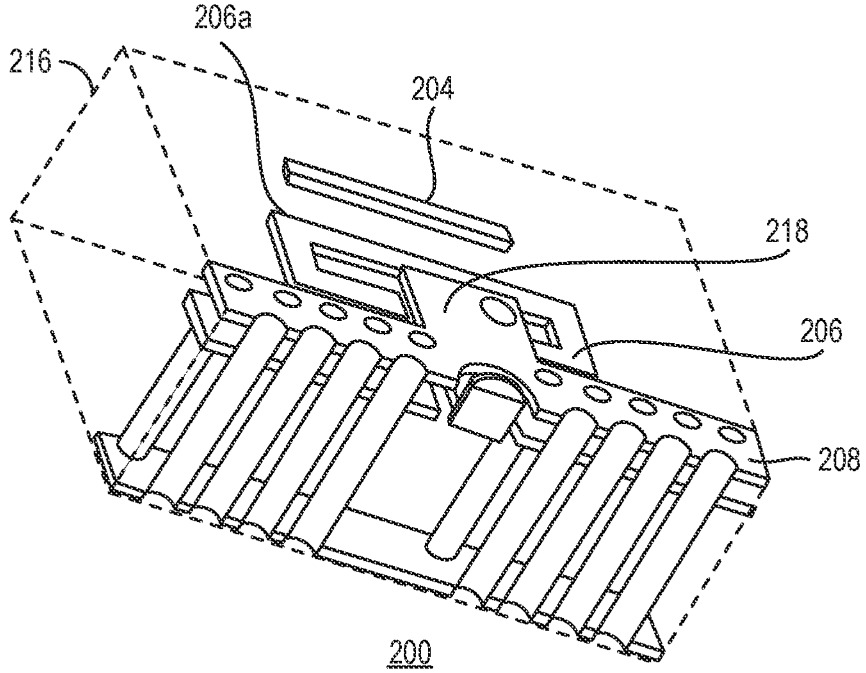
FIG. 4 shows a third embodiment of the antenna element 200.

FIG. 4 shows a perspective view of a third embodiment of the antenna element 200 with a different configuration. In this embodiment, compared with FIGS. 2A-2E and FIG. 3, the antenna element 200 structure has the top and middle metal layers interchanged. The resonator loop 206*a* and other elements in the same layer now are located in the middle layer 210. The top layer in this embodiment has a solder pad 218 connected to the feed line 206*b* and the back side ground 208. In this way, the top surface of the antenna element 200 can be used to solder and attach to the PCB 101 directly. The substantially looped portion 206*a* of the resonator 206 hides in the middle layer of the antenna element 200 and is well protected from environmental effects. The top layer in the second embodiment includes a metal segment 218 which protrudes from the ground assembly 208. As in the first embodiment, a plurality of metal ground poles are formed on the back side surface to serve as solder pads to the common ground of PCB 101. With these solder pads through a predetermined configuration, the antenna 200 of the present disclosure can be soldered on to a PCB 101 by surface mount technology. When the surface mount antenna 200 standing on its back side is attached to the PCB 101, the radiation direction of the antenna elements 200 are normal to the surface of the printed circuit board (PCB) when mounting.

The ground assembly 208 and part of the feed line 206*b* in the top layer shown in FIG. 2 can also be used as solder pads. However, it is advisable to solder the antenna 200 to the PCB 101 in such a way that the resonator loop 206*a* sticks out and overhangs from the edge of the circuit board to avoid interference to the antenna performance. The radiation direction of the antenna element 200 is parallel to the surface of the PCB 101 in this way. The flexibility to change the radiation direction of signal 106 is a very useful feature as different applications and system compositions may require the radiation direction to adjust for best performance.

The wavelength of the electromagnetic (EM) wave propagating in a dielectric is inversely proportional to the square root of the relative dielectric constant. The length "D" of the resonator loop 206*a* is typically less than a half wavelength in the free space. And the length "L" of ground assembly 208, which determines the maximum linear dimension of the antenna element 200 structure can be made less than a wavelength in the free space, depending on the relative dielectric constant and other configuration considerations. The whole antenna structure can be made into a convenient miniature size to be directly attached to the PCB 101 without extra RF connectors. With precision surface mount technology to reduce placement error and connector loss, antenna elements (i.e., miniature antennas) 200 are ideal for an antenna array 102 application, which uses a large number of antenna elements 200.

Figure 5A:
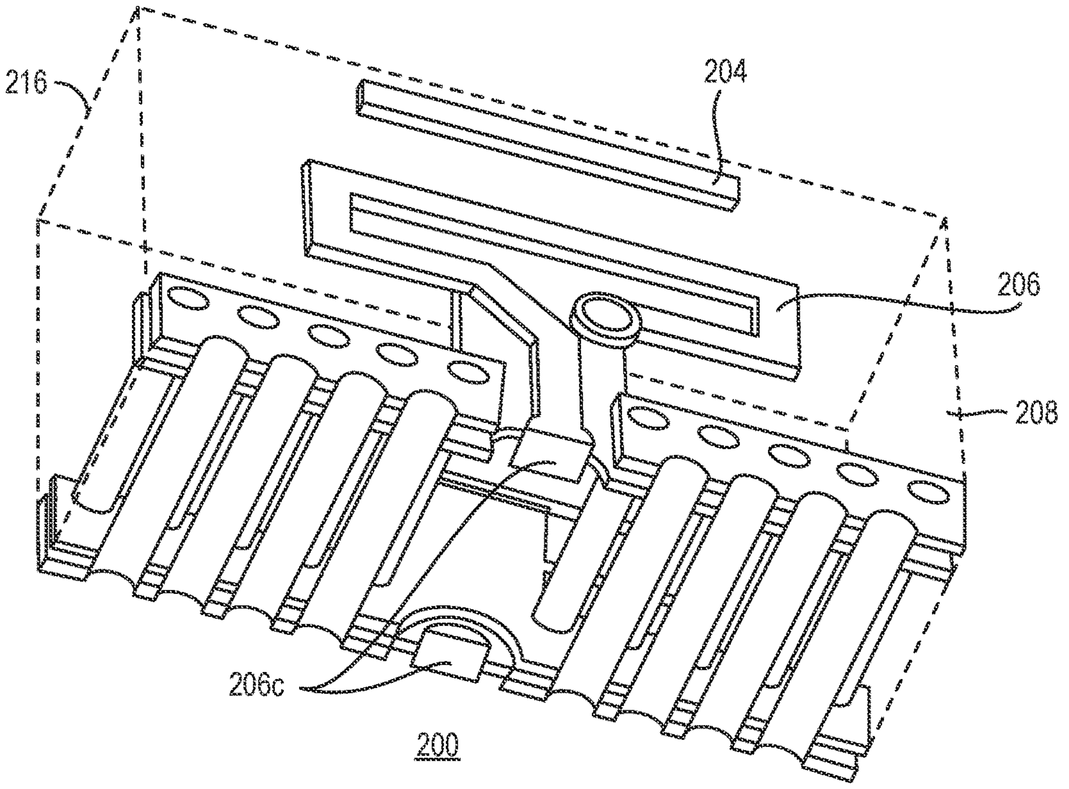
FIGS. 5A-5B show a fourth embodiment of the antenna element 200 with dual band capability.
Figure 5B:
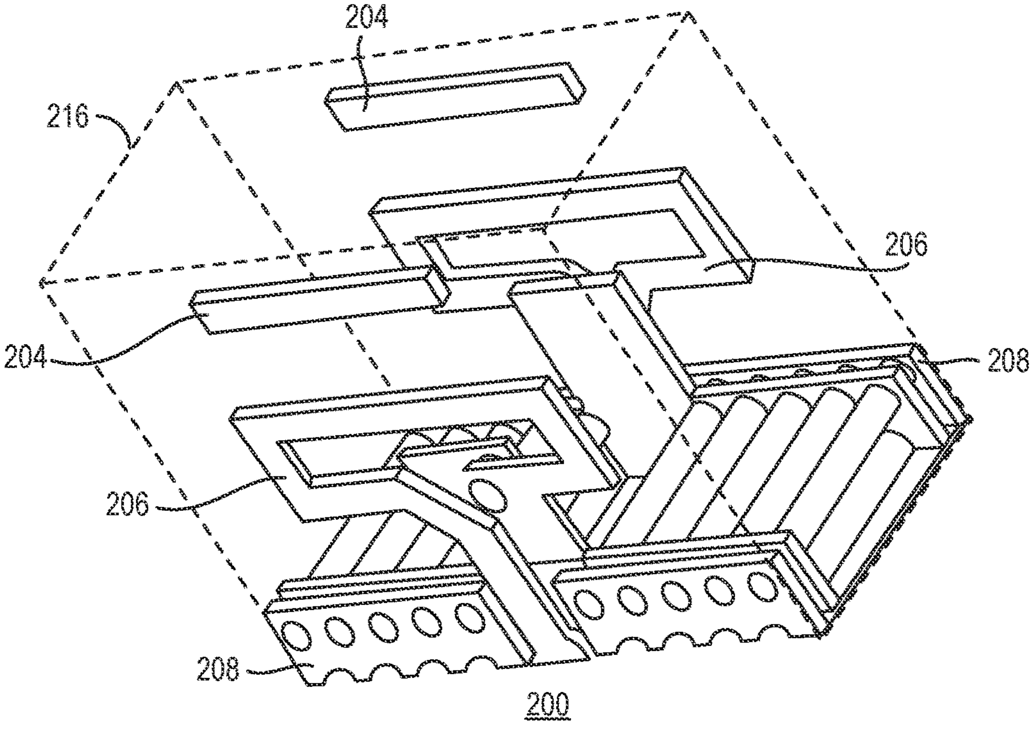

FIGS. 5A-5B show a fourth embodiment with a dual band antenna 200 structure that can be patterned on each side of a PCB 101 structure. In this embodiment, with two resonators 206 in different dimensions and spacing to ground, the dual band may be one portion operating a frequency of approximately 28 GHz and the other portion operating at a frequency of approximately 39 GHz. The antenna element 200 may have dual function with both transmission and reception. The antenna may have RF feed terminals 206*c* for two RF channels. The antenna element 200 may operate in dual directions (e.g., one antenna direction offset by approximately ninety degrees to the other). In addition, one such edge emitting antenna and one surface emitting antenna to the laminated structure to form combined radiation pattern of both.

Implementations of the disclosed embodiments may include one or more of the following. The antenna may be a three-dimensional metal structure having three metal layers. The metal layers comprise antenna elements which are electrically connected and solder pads are provided on two surfaces so that the antenna element 200 can be mounted to a PCB 101 vertically or horizontally using surface mount technology. One advantage of this embodiment is that the radiation direction from the antenna element 200 can be arranged to be normal or parallel to the PCB 101. Another advantage is that a plurality of the surface mountable miniature antenna elements 200 can be arranged to populate on the PCB 101 to easily make antenna arrays or matrices.

As discussed above, the upcoming fifth generation technology standard for broadband communication networks (i.e., 5G, 6G and beyond) communication networks promise higher data rate, greater capacity, less latency and better quality of service than fourth generation long term evolution (4G LTE) networks. The 5G communication standards specify two frequency ranges including the microwave frequency which operates in the approximately 600 Mega Hertz (MHz) to approximately 24 GigaHertz (GHz) range and the millimeter wave (mmWave) frequency which operates in the approximately 24 GHz to approximately 300 GHz. Since higher frequency offers much wider bandwidth and therefore higher data rates than lower frequencies, it is beneficial to improve communication components such as antennas for 3 GHz and higher frequencies such as microwave and mmWave applications.

Figure 6:
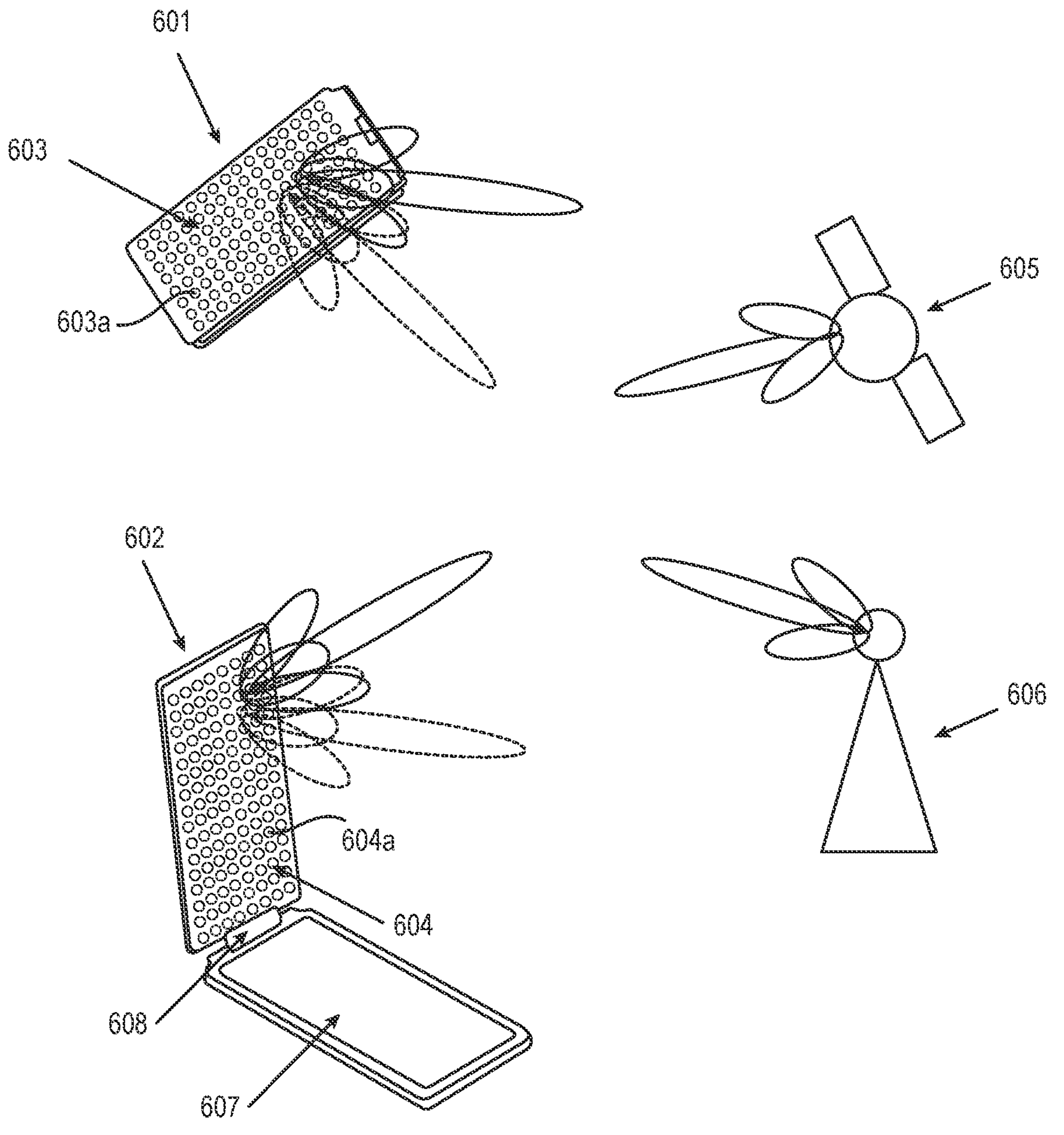
FIG. 6 shows mobile devices with array antennas for communicating with Earth orbiting satellites and base stations on the ground.

FIG. 6 shows a plurality of mobile devices with array antennas for communicating with Earth orbiting satellites and base stations on the ground. In FIG. 6, various mobile devices such as a smartphone 601 and foldable smartphone 602 (also known as a flip-phone) equipped with antenna arrays (603, 604), engage in communication with orbiting satellite 605 in space and base station (BS) 606 on the ground. The antenna arrays (603, 604) comprise a plurality of antenna elements (603*a*, 604*a*) which are represented by dots in FIG. 6. These arrays (603,604) enable high-frequency RF communications by incorporating beam forming and beam steering for connectivity to satellites 605 or base stations 606. In the context of 4G, 5G, 5G Advanced, and 6G mobile communication, ground-based base stations are also referred to as terrestrial base stations.

Satellites in space may orbit at various altitudes, ranging from a few hundred kilometers to higher altitudes. Depending on altitude and orbital characteristics, satellites may fall into categories such as very low Earth orbits (VLEO), low Earth orbits (LEO), equatorial low Earth orbits (ELEO), or medium Earth orbits (MEO). Some satellites maintain a geosynchronous orbit (GEO) orbiting the Earth at the same rate as its rotation while appearing stationary relative to a fixed point on ground.

Smartphones and other mobile devices equipped with array antennas (603, 604) empower users to engage in high-frequency communications, employing RF beam control to establish connections with satellites orbiting the Earth or base stations located on the ground. Mobile devices (601 or 602) can communicate with satellites 605 or base stations 606 either simultaneously or individually and can transition between satellites or terrestrial base stations. The radio waves from each antenna element (603*a*, 604*a*) combine through constructive and destructive interference, enhancing radiation in desired directions while suppressing it in others. This enables advantages like higher gain, increased directivity, beam steering capabilities, and interference cancellation compared to a single antenna element. Antenna arrays (603, 604) typically cover RF frequency bands ranging from 0.6 to 100 GHz, facilitating voice calls and internet connectivity. For instance, phones can connect to the internet via satellites in Ku and Ka bands.

With antenna arrays (603, 604), the system can shape and direct radiation patterns of transmitted or received signals, enabling beam steering to focus energy towards intended targets, improving signal strength, and reducing interference. Beamforming enhances signal quality and reception by emphasizing desired signals while suppressing interference and noise. In multipath environments, where signals take multiple paths due to reflection, diffraction, and scattering, beamforming mitigates multipath fading effects by adaptively adjusting array weights based on channel conditions. These beamforming techniques find application in various wireless systems, including cellular networks, Wi-Fi, radar systems, and satellite communications, enhancing coverage, capacity, and link quality.

The antenna arrays (603, 604) can have one or more layers of dielectric material, with a pattern of conductive material serving as the resonator of each element. The arrays (603, 604) can be attached or embedded into glass or layers within LED, OLED, QLED, and other types of display panels. In an exemplary embodiment, the array (603, 604) is positioned behind or beneath the display layer to minimize obstruction to the display by users. Additionally, the dimension and geometry of the array can be controlled via software to activate antenna elements, for instance, based on user hand location.

In one embodiment, an array antenna 604 is integrated into the foldable panel of a flip-phone 602. FIG. 6 depicts the array antenna 604 on a foldable panel of the phone 602 with the surface 607 serving as a display and touch-sensitive input area. A 2-degree-of-freedom rotary hinge 608 allows rotation for optimizing RF signal reception. The flip-phone 602 can be powered by its own battery or the mobile device's battery, maximizing coverage and performance.

Figure 7:
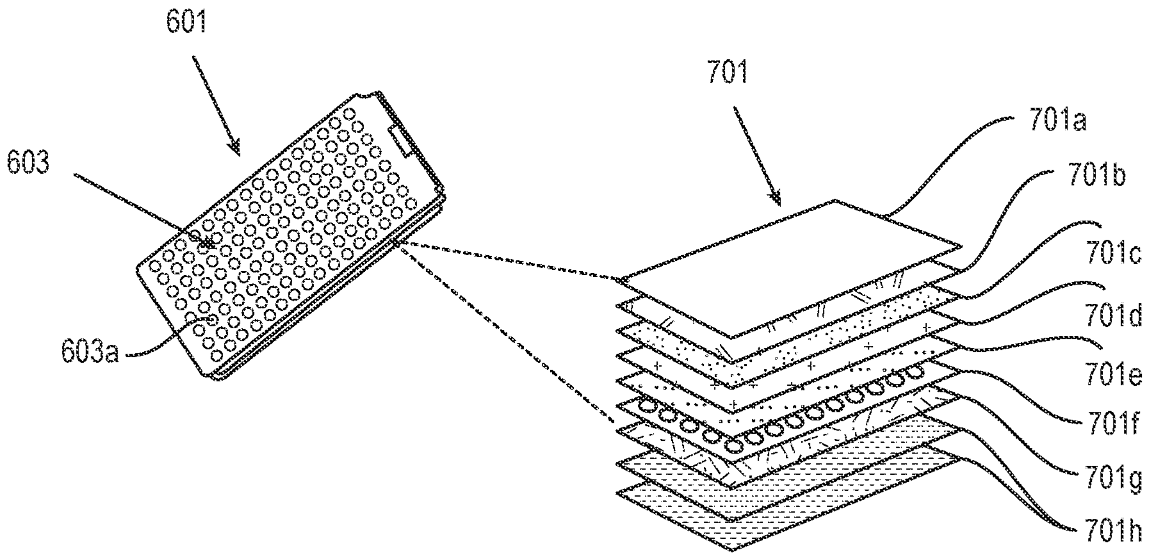
FIG. 7 shows the structure of an antenna array in a multilayer display screen.

FIG. 7 shows the structure of an antenna array 603 in a multilayer display screen. In this embodiment, the antenna array 603 is seamlessly integrated into the touch screen of mobile device 601 (e.g., smartphone, tablet). As depicted in FIG. 7, the touch-sensitive display screen 701 comprises a multi-layered structure (701), comprising: front panel, potentially featuring an anti-fingerprint coating (701*a*); dielectric layer of display electrodes (701*b*); pixels, plasma cells, or liquid crystal layer (701*c*); dielectric layer of address electrodes (701*d*); backlight unit (reflector sheet) (701*e*); one or more layers of the antenna array elements (701*f*); ground layer (701*g*); RF integrated circuit (RFIC) layers (701*g*); and beam control layers (701*h*). Each antenna array (603, 604) can be a low-profile planar patch antenna, having a flat metal patch mounted over a larger ground plane on a dielectric substrate. It can comprise a flat rectangular, circular, or other geometrically shaped sheet of metal (known as the patch) mounted over a larger ground plane on a dielectric substrate. This configuration forms a resonant microstrip transmission line structure, with the patch acting as the top conductor and the ground plane as the bottom conductor. Radiation occurs from fringing fields along the edges of the patch. These antennas are characterized by their low profile and lightweight nature, rendering them suitable for mounting on surfaces or integration with microwave circuits.

The antenna elements (603*a*, 604*a*) with beam control can integrated on a semiconductor substrate such as GaAs, InP, and Silicon. In the embodiments disclosed herein, semiconductor Radio Frequency Integrated (RFIC) including circuit components, such as oscillators, mixers, filters, power amplifiers (PA), low noise amplifiers (LNA), switches, transmission lines, phase shifters, gain attenuators, and others are fabricated on one or more semiconductor layers. Alternatively, integration can take place on a printed circuit board (PCB), where RF circuits are constructed. The layers of circuit interconnection and substrates can also include the integrated circuits (IC) hardware for logic and control in beam forming and steering of the antenna array. These layers of array antenna, RFIC, and controls can be integrated vertically allowing for high-frequency communication with beam control, maximizing coverage and performance. The layers of display function, antenna array, RFIC, beam forming and digital control are stacked and interconnected using interposers and via holes. The structure of display screen 701, as shown on FIG. 7, reduces the overall size of display function units and RF function units, and ultimately resulting in reduced form factor of mobile devices 601, 603 including smart phones.

Figure 8A:
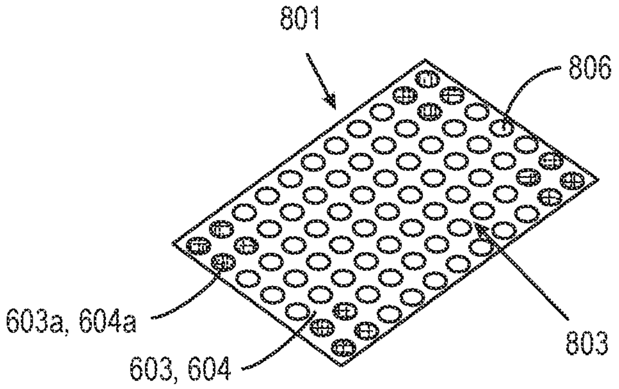
FIGS. 8A-8C show software programmable antenna arrays.
Figure 8B:
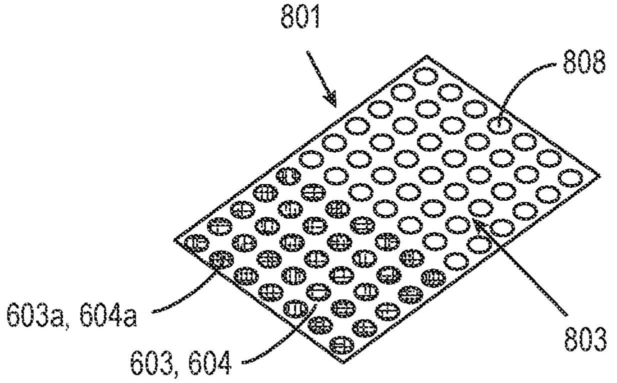
Figure 8C:
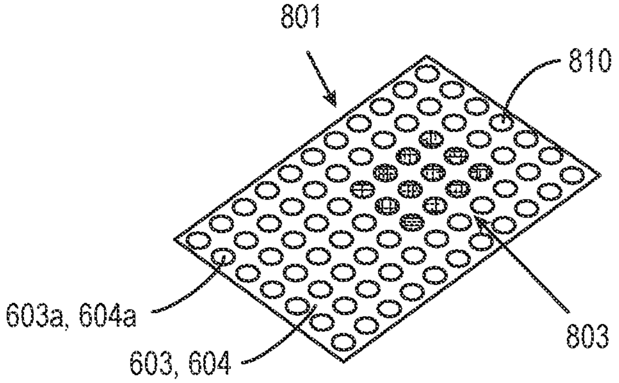

FIG. 8A shows antenna arrays (603, 604) that are software programmable. In one embodiment, the antenna array's geometry and activation can be software-controlled, allowing adaptive activation of antenna elements. The programming is capable of turning on and off the antenna elements. In FIG. 8A, the activated antenna elements (603*a*, 604*a*) are depicted in empty circles 801 while inactive ones are shown in darkened circles 803 forming array pattern 806. These antenna elements (603*a*, 604*a*) comprise one or more conductive and dielectric layers, allowing for control of array dimension and geometry by selectively activating and deactivating electromagnetic wave resonators. This renders different array patterns shown in FIGS. 8A, 8B and 8C are referenced as 806, 808, and 810 and result in varied antenna characteristics. The antenna geometry can be adjusted using software controls, with potential for multi-layered arrays controlled by conductive/dielectric pixels. Both the X- and Y-dimensions of the arrays (603, 604) can be manipulated by these pixels, while the through-thickness dimension (Z-axis) can be used to control the effective thickness of conductive and/or dielectric material layers, optimizing electromagnetic wave properties of the antenna elements (603*a*, 604*a*) for preferred reception and emission. For example, using a network of switches effective layers of elements can be isolated, activated and manipulated. In an embodiment: interposers that sit between two or more semiconductor chips/dies, enabling them to communicate and work together. In another embodiment, via holes are small plated holes that provide electrical pathways between metal layers in semiconductor devices and packages. This adaptive activation can optimize antenna characteristics and reception performance.

Approximately: refers herein to a value that is almost correct or exact. For example, "approximately" may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Communication: in this disclosure, devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

Configured To: various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits. Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 (f) interpretation for that component.

Although process (or method) steps may be described or claimed in a particular sequential order, such processes may be configured to work in different orders. in other words, any sequence or order of steps that may be explicitly described or claimed does not necessarily indicate a requirement that the steps be performed in that order unless specifically indicated. further, some steps may be performed simultaneously despite being described or implied as occurring non-simultaneously (e.g., because one step is described after the other step) unless specifically indicated. moreover, the illustration of a process by its depiction in a drawing does not imply that the illustrated process is exclusive of other variations and modifications thereto, does not imply that the illustrated process or any of its steps are necessary to the embodiment(s), and does not imply that the illustrated process is preferred.

Means Plus Function Language: to aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

Ranges: it should be noted that the recitation of ranges of values in this disclosure are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. for example, the range "1 to 10" shall be interpreted to specifically include whole numbers between 1 and 10 (e.g., 1, 2, 3, . . . 9) and non-whole numbers (e.g., 1.1, 1.2, . . . 1.9).

The foregoing description and embodiments have been presented for purposes of illustration and description and are not intended to be exhaustive or to limit the embodiments in any sense to the precise form disclosed. Also, many modifications and variations are possible in light of the above teaching. The embodiments were chosen and described to best explain the principles of the disclosure and its practical application to thereby enable others skilled in the art to best use the various embodiments disclosed herein and with various modifications suited to the particular use contemplated. The actual scope of the invention is to be defined by the claims.

The invention claimed is:

1. A display device with a dual purpose display screen having a phase array antenna comprising:

a front panel layer;

a layer of display electrodes and a layer of pixels;

a layer of the phase array antenna with addressable patch antenna elements configured with feed lines which are capable of transmitting and receiving radio frequency (RF) signals through the front panel layer to and from satellites orbiting the Earth and base stations on the ground;

a radio frequency integrated circuit (RFIC) layer;

a radio beam forming control layer; and a ground layer and a plurality of interposers connecting the RFIC layer to the antenna array layer.

2. The device of claim 1, wherein the patch antenna elements are substantially circular or square in shape.

3. The device of claim 1, wherein the RF signals are fed by interposers to the patch antenna elements.

4. The device of claim 1, wherein the RF signals are fed by via holes to the patch antenna elements.

5. The device of claim 1, wherein the patch antenna elements are fabricated on a dielectric material.

6. The device of claim 1, wherein the RF signals are in the range of approximately 0.6 GigaHertz (GHz) to approximately 100 GHz range.

7. The device of claim 1, wherein geometry and activation of the patch antenna elements are software-controlled which allows for adaptive activation of the addressable patch antenna elements.

8. The device of claim 1, wherein geometry of the patch antenna elements are capable of being adjusted using software controls and wherein the phase antenna array having is controlled by conductive and dielectric pixels.

9. A display device with a dual purpose display screen having a phase array antenna used in mobile communication comprising:

the phase array antenna being configurable in size and dimension through control of addressable elements and wherein the addressable elements are capable of forming one or more signal beams to transmit radio frequency (RF) signals;

one or more radio frequency integrated circuits (RFIC's); and a network of switches to activate and deactivate RF signals to and from satellites orbiting the Earth and base stations on the ground.

10. The device of claim 9 further comprising multilayer interposer that sit between two or more semiconductor layers of chips, enabling them to communicate and work together.

11. The device of claim 9, wherein the RF signals are fed by via holes to the antenna elements.

12. The device of claim 9 further comprising via holes that are small plated holes that provide electrical pathways between metal layers in semiconductor devices and packages.

13. A display device with a dual purpose display screen comprising:

a front panel layer;

a layer of display electrodes and a layer of pixels;

a layer of antenna array with addressable patch antenna elements configured with feed lines to change the geometry and size of the array which are capable of transmitting and receiving radio frequency (RF) signals through the front panel layer to and from satellites orbiting the Earth and base stations on the ground, wherein the antenna array is capable of receiving programming to turn on and off the antenna elements;

one or more radio frequency integrated circuit (RFIC) layers;

a radio beam forming control layer;

a ground layer and a plurality interposers connecting the RFIC layer to the antenna array layer; and a network of switches to activate and deactivate the RF signals.

14. The device of claim 13, wherein the patch antenna elements are substantially circular or square in shape.

15. The device of claim 13, wherein the RF signals are fed by interposers to the patch antenna elements.

16. The device of claim 13, wherein the RF signals are fed by via holes to the patch antenna elements.

17. The device of claim 13, wherein the patch antenna elements are fabricated on a dielectric material.

18. The device of claim 13, wherein the RF signals are in the range of approximately 0.6 GigaHertz (GHz) to approximately 100 GHz range.

19. The device of claim 13, wherein geometry and activation of the patch antenna elements are software-controlled which allows for adaptive activation of the addressable patch antenna elements.

20. The device of claim 13, wherein geometry of the patch antenna elements are capable of being adjusted using software controls and wherein the phase antenna array having is controlled by conductive and dielectric pixels.

* * * * *